United States Patent
Hammonds

(10) Patent No.: US 7,690,473 B2
(45) Date of Patent: Apr. 6, 2010

(54) OMNI-DIRECTIONAL VEHICLE WITH ELEVATABLE OBSERVATION PLATFORM

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 24 days.

(21) Appl. No.: 12/070,434

(22) Filed: Feb. 19, 2008

(65) Prior Publication Data

US 2009/0205880 A1     Aug. 20, 2009

(51) Int. Cl.
*B62D 6/00* (2006.01)
(52) U.S. Cl. ..................................... 180/326
(58) Field of Classification Search ................ 180/326, 180/327, 89.13, 7.2
See application file for complete search history.

(56) References Cited

U.S. PATENT DOCUMENTS

| | | | |
|---|---|---|---|
| 75,274 A | 3/1868 | Hurd | |
| 1,467,456 A | 9/1923 | Silvius | |
| 2,869,686 A | 1/1959 | Glanz | |
| 3,154,162 A | 10/1964 | McCaleb et al. | |
| 3,763,945 A | 10/1973 | Danielson | |
| 3,820,790 A | 6/1974 | Peterson | |
| 3,938,608 A | 2/1976 | Folco-Zambelli | |
| 4,077,647 A | 3/1978 | Nagayama | |
| 4,084,777 A * | 4/1978 | Lambert | 248/287.1 |
| 4,111,273 A | 9/1978 | Blackburn et al. | |
| 4,142,599 A | 3/1979 | Schmitt | |
| 4,221,273 A * | 9/1980 | Finden | 180/6.48 |
| 4,301,881 A | 11/1981 | Griffin | |
| 4,306,329 A | 12/1981 | Yokoi | |
| 4,308,713 A | 1/1982 | James | |
| 4,324,301 A | 4/1982 | Eyerly | |
| 4,463,821 A | 8/1984 | Falamak | |
| 4,597,498 A * | 7/1986 | Spinosa et al. | 212/303 |
| 4,638,445 A | 1/1987 | Mattaboni | |
| 4,655,470 A | 4/1987 | Lin | |
| 4,973,206 A | 11/1990 | Engle | |
| 5,090,185 A | 2/1992 | Meeks | |
| 5,105,915 A * | 4/1992 | Gary | 187/200 |
| 5,139,102 A | 8/1992 | Pocapalia | |
| 5,163,273 A | 11/1992 | Wojtkowski | |

(Continued)

FOREIGN PATENT DOCUMENTS

JP     62-283072     12/1987

(Continued)

*Primary Examiner*—Lesley Morris
*Assistant Examiner*—Levon Fiore
(74) *Attorney, Agent, or Firm*—Gary L. Bush; Andrews Kurth LLP

(57) ABSTRACT

A powered omni-directional security, patrol and surveillance vehicle that includes a circular frame and two drive wheels capable of independent powered forward and rearward rotation about a horizontal axis. The drive wheels are adapted to allow the vehicle to spin in place about a vertical axis which intersects the horizontal axis midway between the drive wheels and which is generally centered in the circular frame. An observation platform including an operators control station is mounted to the frame on a lift such that it is capable of selective elevation for superior vantage points. A cab preferably encloses the operator's station. A plurality of swivel casters disposed on distal ends of telescopic outrigger arms are circumpositioned about the circular frame.

11 Claims, 7 Drawing Sheets

U.S. PATENT DOCUMENTS

| | | |
|---|---|---|
| 5,246,081 A | 9/1993 | Engle |
| 5,305,805 A | 4/1994 | Watkins, Jr. |
| 5,330,222 A | 7/1994 | Halverson et al. |
| 5,381,987 A | 1/1995 | Carns |
| 5,404,695 A | 4/1995 | Gemelli |
| 5,484,030 A | 1/1996 | Glenn |
| 5,516,169 A | 5/1996 | Falk et al. |
| 5,623,818 A | 4/1997 | Ledbetter |
| 5,704,201 A | 1/1998 | Van Vleet |
| 5,720,077 A | 2/1998 | Nakamura et al. |
| 5,893,398 A | 4/1999 | Garrett, Jr. |
| 6,095,267 A | 8/2000 | Goodman |
| 6,095,268 A | 8/2000 | Jones, Jr. |
| 6,112,838 A | 9/2000 | Klein et al. |
| 6,250,663 B1 | 6/2001 | Maloy |
| 6,276,750 B1 * | 8/2001 | Frisch .................. 296/190.1 |
| 6,408,970 B1 | 6/2002 | Eng |
| 6,481,515 B1 | 11/2002 | Kirkpatrick et al. |
| 6,581,703 B2 | 6/2003 | Hammonds |
| 6,668,471 B1 | 12/2003 | Cook et al. |
| 6,830,114 B2 * | 12/2004 | Hammonds ................ 180/6.2 |
| 7,040,425 B2 | 5/2006 | Hammonds |
| 2003/0213626 A1 | 11/2003 | Hafendorfer |
| 2003/0222447 A1 | 12/2003 | Powell |
| 2004/0079560 A1 | 4/2004 | Hammonds |
| 2005/0173163 A1 | 8/2005 | Hammonds |

FOREIGN PATENT DOCUMENTS

| | | |
|---|---|---|
| WO | WO 2007/100878 | 9/2007 |

* cited by examiner

OMNI-DIRECTIONAL VEHICLE WITH ELEVATABLE OBSERVATION PLATFORM

BACKGROUND OF THE INVENTION (1) Field of the Invention

This invention relates generally to a wheeled vehicle designed to turn about a vertical axis. In particular, the invention relates to powered utility riding vehicles of the type useful for observation, patrol, surveillance and security operations.

(2) Description of Prior Art

Conventional security vehicles used for patrol and surveillance are typically configured with two axles, one in the rear, the other in the front. The rear axle has non-steerable wheels and provides motive force; two steerable wheels are located at the front end of the vehicle, each operating in concert to provide steering of the vehicle. As there is a distance between the axis of the rear drive wheels and the axis of the front steerable wheels, a turning radius is required that far exceeds the space actually occupied by the vehicle itself. The longer the distance between front and rear axles, the larger the turn radius becomes. A large turning radius makes maneuvering around crowded parking lots, plants, airports, city sidewalks, shopping centers, etc., difficult and often dangerous, particularly in congested areas. Often, operators are required to back up, necessitating that they look over their shoulders. A need exists for a security vehicle that requires less area for its footprint and has a smaller turn radius for tight maneuvering so that safety of the operator, bystanders, and surroundings is enhanced.

Furthermore, the elevation of the vantage point provided by prior art security and observation vehicles is limited to that provided by the frame of the vehicle. A vehicle which provides an observation platform that can be selectively raised may be advantageous for some uses.

(3) Identification of Objects of the Invention

A primary object of the invention is to provide a patrol, surveillance and security vehicle that has enhanced maneuverability to allow security personnel to maneuver in tight spaces.

Another object of the invention is to provide a patrol, surveillance and security vehicle that can turn on the spot and be of the smallest physical size relative to the space it occupies.

Another object of the invention is to provide a patrol, surveillance and security vehicle that reduces the risk of accidents which result in damage or injury to bystanders, equipment or operating personnel.

Another object of the invention is to provide a patrol, surveillance and security vehicle with an elevated seating height which allows security personnel to see over pedestrians and parked or moving vehicles resulting in expanded views and less driving.

Another object of the invention is to provide a patrol, surveillance and security vehicle with an operators cab or observation platform that can be raised so that the operator may easily see over fence lines and tall objects.

SUMMARY OF THE INVENTION

The objects identified above, as well as other features of the invention are incorporated in a vehicle that, due to a combination of its characteristics including its circular shape and the configuration of its drive wheels, provides unique maneuverability and efficiency. When the circular vehicle is combined with an observation platform or cab disposed on a lift, such combination provides for a superior patrol, surveillance and security vehicle with minimal space required for maneuverability and safety of operation.

The vehicle according to one embodiment of the invention has a frame with a perfectly round outer surface about its perimeter and substantially no external appendages. That outer surface is characterized as a perfect, unobstructed smooth circle defined by a vertical axis of the vehicle. The vehicle has two independent drive wheels located on a horizontal axis which intersects the vertical axis. Each wheel is at exactly the same distance from the vertical axis, with each wheel having the capability to move independently and at infinitely variable speeds in either direction.

In operation, the axis of the drive wheels is rotated by rotating one wheel in one direction and the other in the opposite direction until it is perpendicular to the direction of the desired travel. The vehicle rotates about the vertical axis to any radial position without changing its original footprint. The "footprint" is the area on the ground below the vehicle when it is at rest. Once the desired drive axle orientation is reached (perpendicular to the desired direction of travel), both wheels are driven forward equally, causing the vehicle to move in the direction perpendicular to the drive wheel axis. Thus, the vehicle is capable of movement in any direction and has a zero turn radius. The omni-directional maneuvering characteristics of the vehicle reduce the operating space on the ground required to negotiate obstructions, thus increasing operating efficiency. Safety is increased because the operator, positioned at the center of the vehicle, is always facing the direction the vehicle is moving, never having to back up or look backwards.

The vehicle includes an observation platform or cab disposed on a lift to provide selectively elevated vantage points. An operators station is preferably positioned in the center of the observation cab. Swivel casters disposed on the distal ends of telescopic outrigger arms provide support to the ODV frame.

BRIEF DESCRIPTION OF THE DRAWINGS

The invention is described in detail hereinafter on the basis of the embodiments represented in the accompanying figures, in which.

DESCRIPTION OF THE PREFERRED
EMBODIMENT OF THE INVENTION

Figure 1:
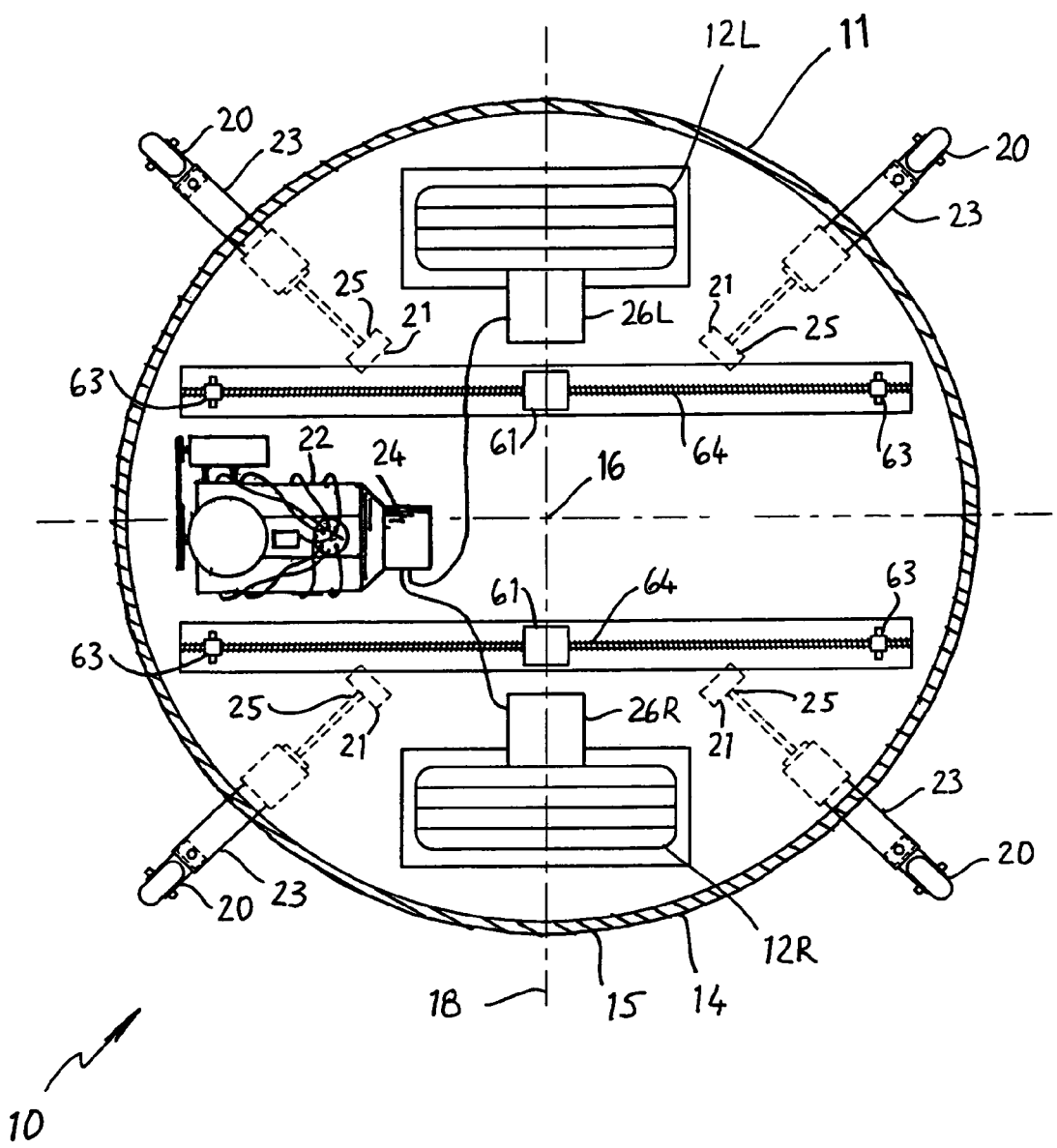
FIG. 1 is a horizontal cross section view taken along lines 1-1 of FIG. 2 of a security, patrol and surveillance omni-directional vehicle (ODV) according to an embodiment of the invention showing a base assembly with independent drive wheels, a power source, caster wheels on adjustable outrigger arms, and lead screw actuators for operating a scissor lift.
Figure 2:
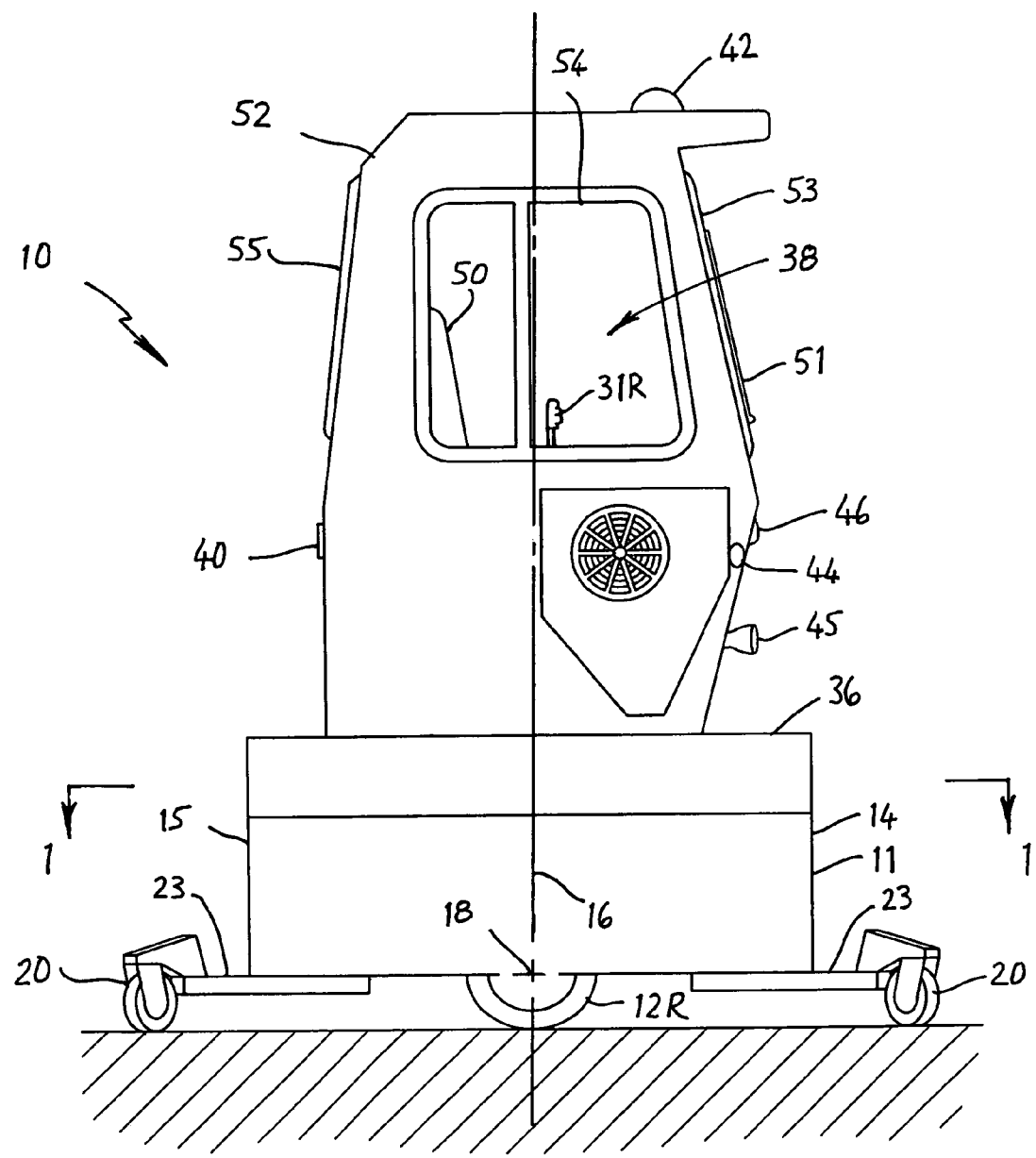
FIG. 2 is a side view orthographic elevation of the ODV of FIG. 1 showing a cylindrical base assembly with drive wheels, outrigger support arms disposed in a retracted position, and an observation platform disposed on top of the base, having an operating station centered in an enclosed cab.

FIG. 1 is a horizontal cross section, taken along lines 1-1 of FIG. 2, looking down into the base assembly 11 of a patrol, surveillance and security omni-directional vehicle 10 (hereafter ODV) according to one embodiment of the invention. The base 11 has a frame 14 which has an outer perimeter 15 in the shape of a circle. The circular frame 14 has a vertical axis 16 which is perpendicular to the horizontal plane of FIG. 1. ODV 10 includes two drive wheels 12R, 12L rotatively mounted on frame 14. The drive wheels 12R, 12L are mounted along a horizontal axis 18 which is perpendicular to and intersects vertical axis 16 as shown in FIGS. 1-2.

Referring to FIG. 1, a power source 22 is mounted on the frame 14. The power source 22 is preferably a diesel engine but other sources 22 may be used, including a gasoline internal combustion engine or turbine engine. In one embodiment, power source 22 drives an electrical generator 24 in a manner similar to a motive drive assembly of a diesel-electric locomotive for train service, for example. The generator 24 provides electrical power to two separate motor assemblies 26R, 26L, one for driving each wheel 12R, 12L. Drive motors 26R, 26L are preferably DC electric motors which allow continuously variable speed in either direction and instant starting, stopping and reversing. The speed and direction of rotation of motors 26R, 26L (and the drive wheels 12R, 12L driven thereby) are controlled by two user-operated control levers 31R, 31L disposed to the right and left of the operators seat 50 (FIG. 3), which cause drive current to be supplied to motors 26R, 26L for the desired motion.

In an alternate embodiment of the invention, power source 22 drives a hydraulic pump 24 instead of an electric generator 24. Drive motors 26R, 26L are bidirectional gear-type hydraulic motors. The hydraulic pump provides balanced pressurized hydraulic fluid to the two separate motor assemblies 26R, 26L, one for each drive wheel 12R, 12L. The speed and direction of rotation of motors 26R, 26L, and the drive wheels 12R, 12L driven thereby, are controlled by user-operated hand levers 31R, 31L (FIG. 3) that selectively port hydraulic fluid to the motors 26R, 26L. Other suitable drive and control arrangements may also be used, so long as the wheels 12R, 12L are driven independently of one another.

Figure 3:
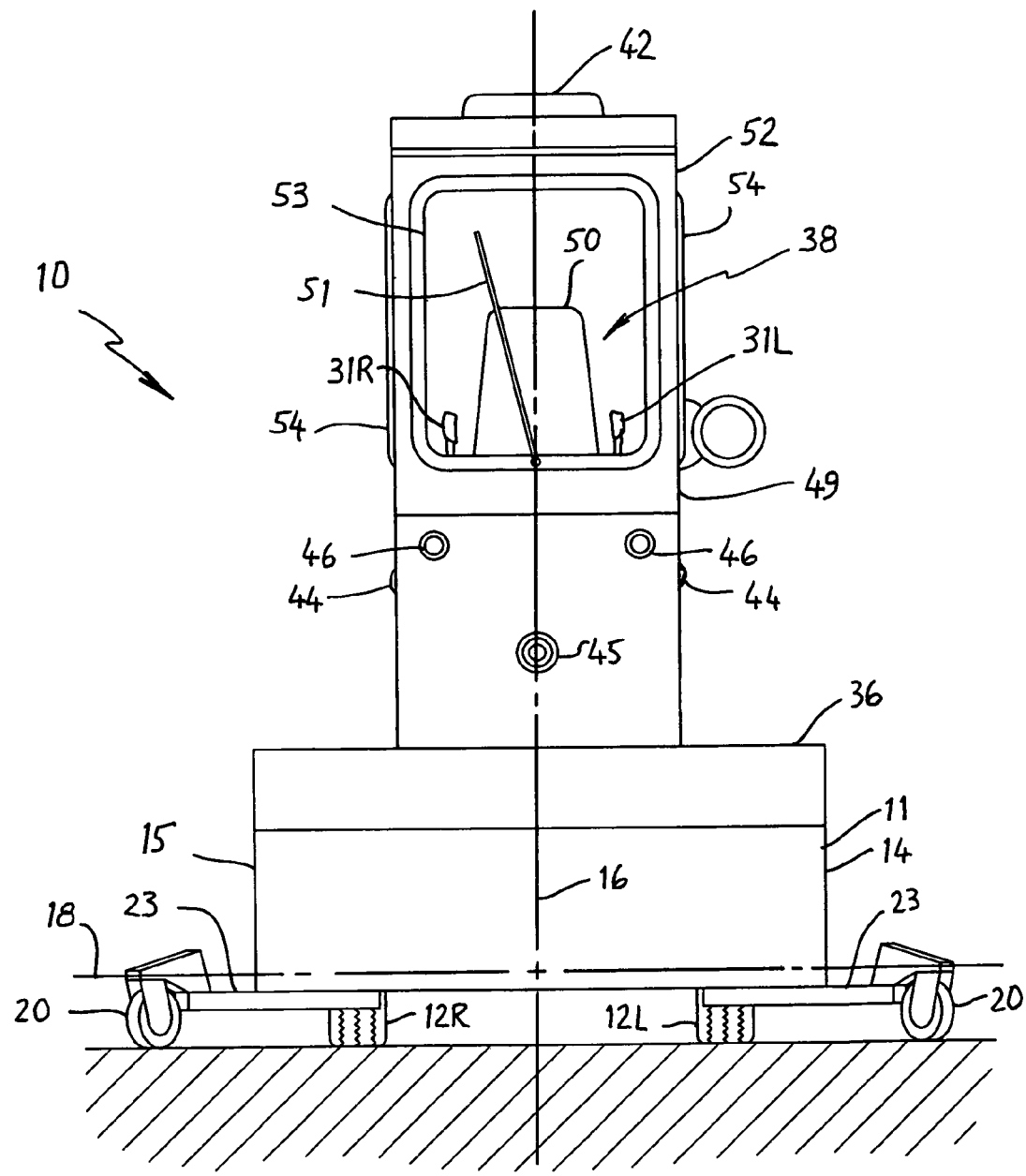
FIG. 3 is a front view orthographic elevation of the ODV of FIG. 2.

Referring to FIGS. 1 and 3, ODV control inputs preferably include two user-operated hand levers 31R, 31L, one for an operator's right hand and the other for the operator's left hand. The right and left control levers 31R, 31L operate exactly the same to control the right and left drive wheels 12R, 12L, respectively. Each lever 31R, 31L has a neutral position, such that when a lever is at the neutral position, the wheel 12R, 12L associated with that lever is electrically or hydraulically braked. If a lever 31R, 31L is pushed forward away from the operator, the corresponding wheel motor 26R, 26L is driven in the forward direction for turning its attached drive wheel 12R, 12L. Likewise, if a lever 31R, 31L is pulled toward the operator, the corresponding motor 26R, 26L and drive wheel 12R, 12L are driven in reverse. The greater distance that a lever 31R, 31L is moved from its neutral position, the faster the associated wheel motor 26R, 26L and drive wheel 12R, 12L turn.

If both levers 31R, 31L are moved in the same direction and amount and at the same time, both drive wheels 12R, 12L move at the same speed, thereby causing straight-ahead movement of ODV 10 over the ground. That movement is perpendicular to horizontal axis 18. If levers 31R, 31L are pushed forward or backward at an unequal distance from each other, the lever 31R, 31L moved the greater distance will produce a greater speed of rotation, causing ODV 10 to turn in the direction of the slower drive wheel 12R, 12L. For example, if the right control lever 31R is pushed farther forward than is the left lever 31L, ODV 10 turns to the left, and vice versa.

If the right lever 31R is moved forward and the left lever 31L is moved backward and both lever positions are the same in amount and opposite in direction, the left wheel 12L turns backward and the right wheel 12R turns forward, both at the same rate of rotation. In this instance, ODV 10 turns to the left within its own footprint while its footprint generally remains stationary over ground, i.e., the ODV rotates about the vertical axis 16. (The footprint over the ground is the area of the ground beneath the vehicle.) The counter-clockwise rotation described above becomes a clockwise rotation when the right wheel 12R rotates backward at the same rate as the forward rotation of the left wheel 12L. Thus, the ODV 10 can change its heading while generally not moving or varying its footprint over the ground. Generally, if the ODV 10 does not interfere with any object on the ground at one heading, it will not interfere with any object at any heading because the ODV footprint does not change during rotation.

A number of swivel caster wheels 20 are pivotably mounted to the frame 14, circumpositioned about the perimeter 15 of ODV 10. Caster wheels 20 balance ODV 10, keeping frame 14 substantially level and preventing ODV 10 from toppling. Swivel casters 20 are preferably mounted to frame 14 so as to protrude minimally from outer perimeter 15 to prevent contact with other objects while the ODV 10 is moving. Although ODV 10 is illustrated as having four swivel casters 20, any number of swivel casters 20 may be employed at varying points along frame 14, depending on the weight distribution of ODV 10.

Each swivel caster 20 is preferably mounted to the distal end of an extendable outrigger arm 23. The extendable and retractable outriggers 23, moved telescopically by actuators 25, are preferably coupled to the underside of frame 14. Actuators 25 may be lead screw assemblies or rack and pinion assemblies driven by motors 21, for example.

Figure 5:
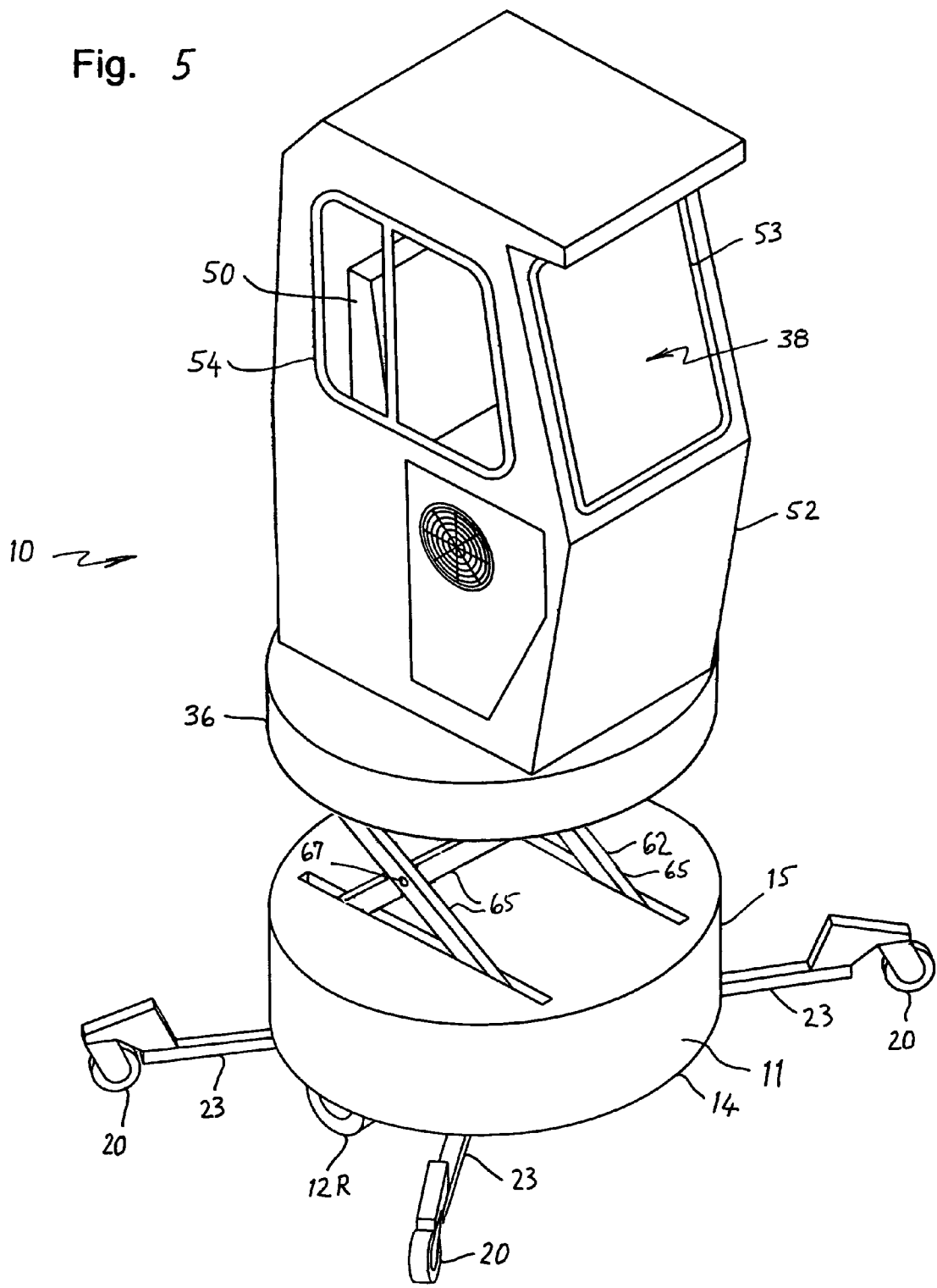
FIG. 5 is an isometric perspective view of the ODV of FIG. 4 shown with the observation platform and cab partially elevated from the base assembly by a scissor lift.
Figure 6:
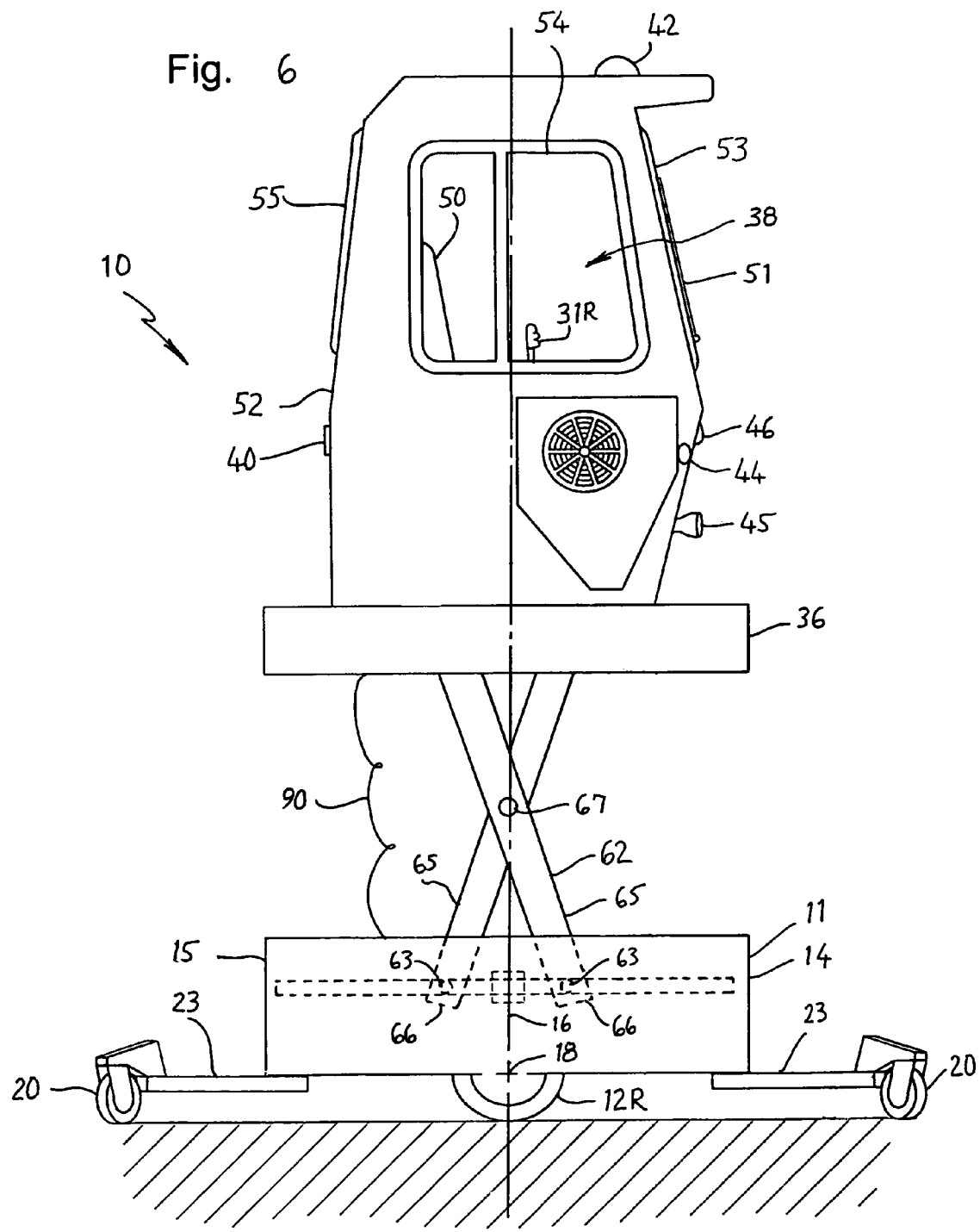
FIG. 6 is a side view orthopedic elevation of the ODV of FIG. 5 shown with the outrigger support arms in extended positions and the observation platform and cab in an elevated position for a superior vantage point.

FIG. 1 also illustrates two lead screw actuators 64 for raising and lowering a scissor lift 62 (FIGS. 5-6). Each lead screw actuator 64 has a bidirectional motor 61 characterized by long, double threaded shafts that drive a pair of carriages 63 inwards and outwards. Each carriage pair 63 is pivotally coupled to the lower ends 66 of a pair of scissor arms 65 (FIGS. 5-6). Each pair of scissor arms are pivotally coupled together at their midpoints 67 (FIGS. 5-6), so that coordinated movement of carriages 63 causes scissor lift 62 to raise or lower. Alternatively, hydraulic cylinders or other actuator arrangements may be used in place of lead screw actuators 64 as appropriate. As actuators are well known in the art, they are not discussed further herein.

FIGS. 2-6 are views of ODV 10 according to a preferred embodiment. An observation platform 36 is shown mounted to the ODV frame 14. The observation platform 36 defines a control station 38 for controlling the movement of ODV 10. A seat 50 for the operator is preferably mounted to the observation platform 36 in a location that coincides with or is near to vertical axis 16 and at a height which is sufficiently high to allow a security officer seated thereon to readily see over most pedestrians and parked or moving vehicles. Control levers 31R, 31L are disposed at the sides of seat 50 for an operator to control movement of ODV 10.

Observation platform 36 preferably includes an enclosed cab 52 to protect the operator from the elements. The cab 52 preferably includes a windshield 53, a windshield wiper 51, a door 49, side windows 54, and a rear windows 55 for complete operator visibility. The cab 52, windshield 53, door 49, and windows 54, 55 may be armored or bullet-proof for added security of the operator. Additionally, cab 52 may optionally have one or more of the following: Headlights 46, turn indicators 48, brake lights 40, a colored strobe light assembly 42, a directional spot light 44, and a siren 45. Cab 52 is preferably heated and air conditioned for the comfort of the operator. ODV 10 may be equipped with a communication transceiver and other law enforcement, security, or patrol gear as appropriate.

Figure 4:
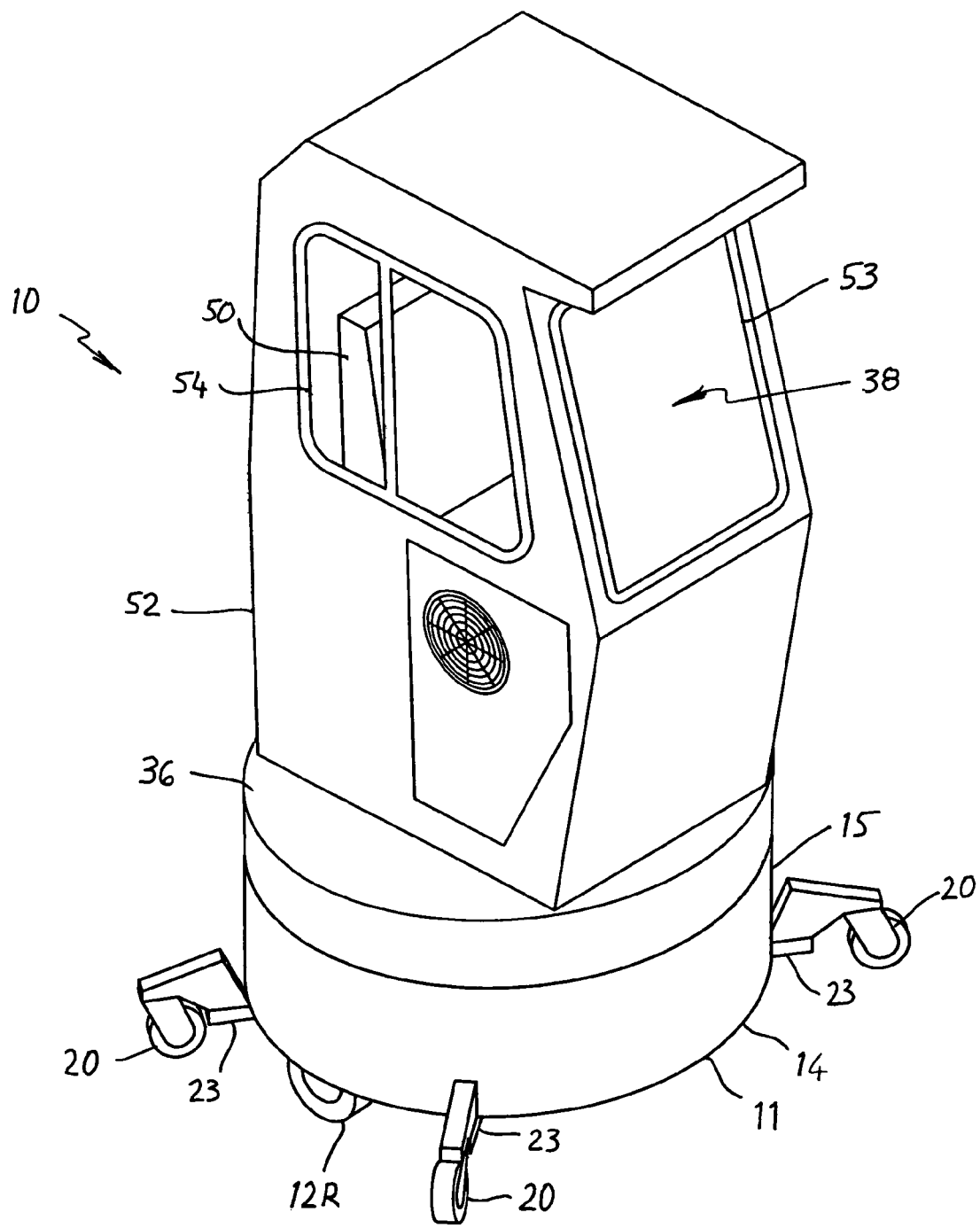
FIG. 4 is an isometric perspective view of the ODV of FIG. 2 showing the observation cab at a lowered elevation and the outrigger arms in retracted positions.

Referring to FIGS. 5-6, in one embodiment, the observation platform 36 is supported by a scissor lift 62 having pivoting arms 65, although other lift mechanisms may be used. The observation platform 36 is preferably raised and lowered by lead screw actuators 64 (FIG. 1) pivotably connected between the lower ends 66 of arms 65. Motors 61 (FIG. 1) are double-shafted stepper or servo motors with lead screws connected to each shaft. In its lowest position, observation platform 36 is disposed directly atop base assembly 11, as illustrated in FIGS. 2-4. The observation platform 36 is elevated by lift 62 so that the operator can obtain a higher vantage point for observing over obstacles, as illustrated in FIGS. 5-6. Control input levers 31R, 31L (FIG. 3) are operatively coupled to pump or generator 24 and motors 26R, 26L by pigtail lines 90. Pigtail lines 90 also transmit power and control between observation platform 36 and base assembly 11.

Outriggers 23 are preferably retracted into a radially inward position to minimize the vehicle footprint when observation platform 36 is at a lowered elevation (FIGS. 2-4), and outriggers 23 are preferably radially extended into a bracing position (FIG. 6) to provide additional support for ODV 10 when observation platform 36 (and hence the center of gravity) is raised during certain surveillance operations.

Figure 7:
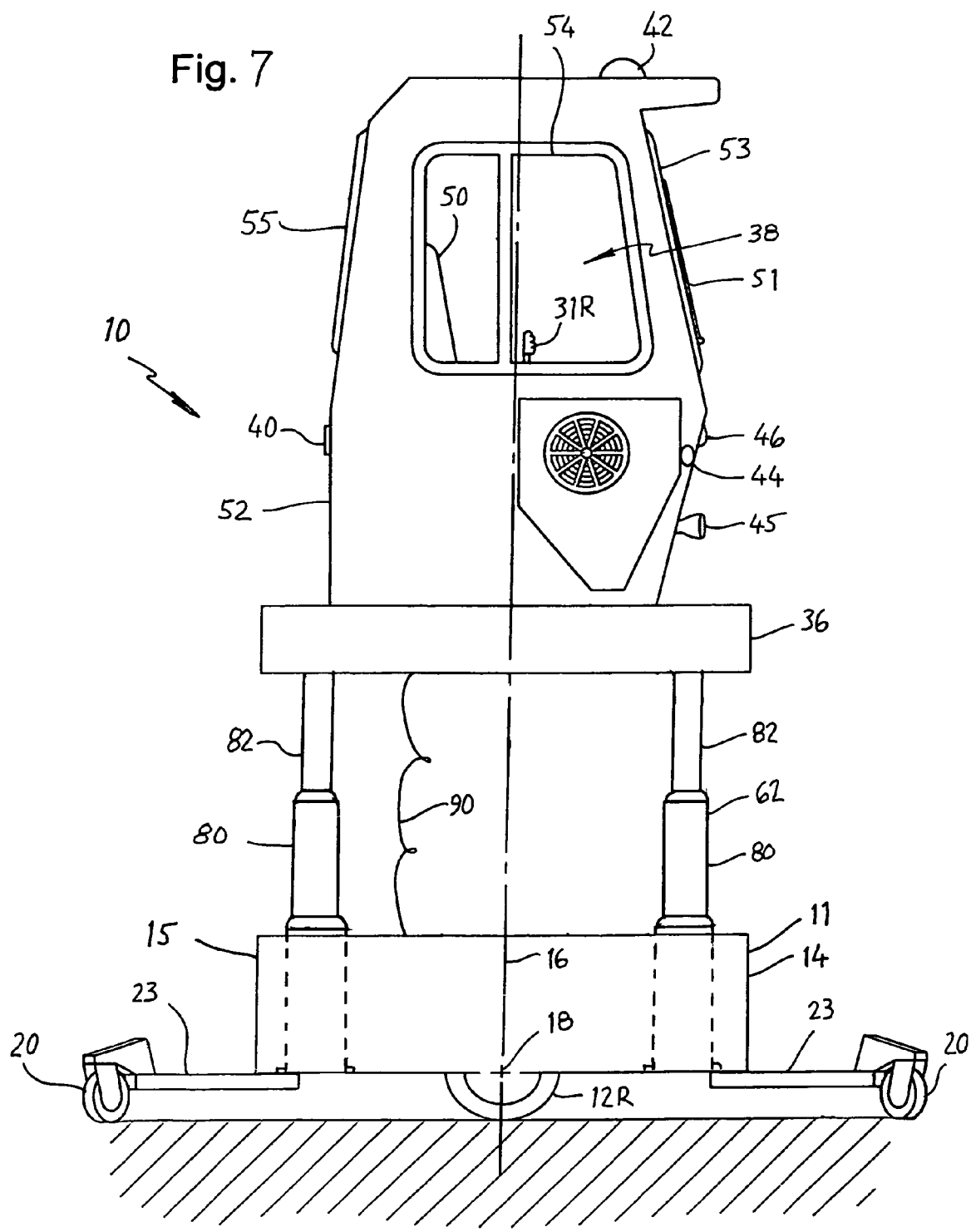
FIG. 7 is an orthographic side view elevation of a security, patrol and surveillance ODV according to a second embodiment of the invention showing a telescopic hydraulic cylinder lift arrangement in place of the scissor life of FIGS. 5-6.

FIG. 7 illustrates an alternate embodiment of the lift mechanism 62 of FIGS. 5-6. Rather than using a scissors lift, a hydraulic lift assembly 80 is directly connected between ODV base assembly 11 and observation platform 36 for selectively raising and lowering the operator's vantage point. Hydraulic lift assembly 80 preferably includes one or more telescopic hydraulic piston-cylinder actuators 82. As hydraulic lifts are well known in the art, they are not discussed further herein. Other lifting mechanisms may also be employed as appropriate.

The Abstract of the Disclosure is written solely for providing the United States Patent and Trademark Office and the public at large with a way by which to determine quickly from a cursory reading the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A security, patrol and surveillance vehicle (10) comprising:
   a powered omni-directional vehicle (11) defining a vertical axis (16) and having a frame (14);
   a lift (62) coupled to said omni-directional vehicle;
   a platform (36) coupled to said lift, said platform including an operators station (38) with inputs (31R, 31L) arranged and designed for controlling the motion of said omni-directional vehicle; and
   a plurality of outrigger arms (23) having proximal ends coupled to said frame (14), said outrigger arms disposed along a plurality of radials of said vertical axis and circumpositioned symmetrically about the perimeter of said vehicle (10), said plurality of outrigger arms arranged and designed to be extended and retracted telescopically by motor-driven actuators along said plurality of radials, said plurality of swivel casters (20) coupled to distal ends of said outrigger arms;
   wherein said frame (14) has a circular circumference that surrounds said lift (62);
   whereby said plurality of outrigger arms and said plurality of swivel casters cooperate to support said vehicle (10); and
   whereby said lift raises and lowers the elevation of said platform with respect to said omni-directional vehicle.

2. The vehicle (10) of claim 1 wherein said onmi-directional vehicle comprises:
   a power source (22) carried by said frame;
   first and second drive wheels (12R, 12L) rotatively coupled to said frame, each of said drive wheels capable of independent powered forward and rearward rotation about a horizontal axis (18) that intersects said vertical axis (16), said first and second drive wheels designed and arranged to revolve about said vertical axis; and
   a plurality of swivel casters (20) mounted to said frame.

3. The vehicle (10) of claim 2 further comprising:
   a first control lever (31R) positioned on a first side of said operators station (38) being operatively coupled to a first motor (26R) for controlling the speed and direction of said first drive wheel (12R); and
   a second control lever (31L) positioned on a second side of said operators station (38) being operatively coupled to a second motor (26L) for controlling the speed and direction of said second drive wheel (12L).

4. The vehicle of claim 3 wherein:
   said vertical axis (16) passes through said operators station (38); and
   said platform (36) is characterized generally by the shape of a disk formed about said vertical axis, said operators station bounded by said platform.

5. The vehicle of claim 1 further comprising:
   a cab (52) disposed on said platform (36); and
   an operators seat (50) disposed on said platform within said cab.

6. The vehicle of claim 5 further comprising:
   armor disposed on said cab, wherein said armor is designed and arranged to protect an operator.

7. A vehicle (10) comprising:
   a security, patrol and surveillance omni-directional vehicle (11) defining a vertical axis (16) and having a frame (14);
   a lift (62) coupled to said omni-directional vehicle; and
   an operator's station (38) arranged and designed for maneuvering said omni-directional vehicle coupled to said lift so as to be raised and lowered with respect to said onmi-directional vehicle by said lift;
   a plurality of outrigger arms (23) having proximal ends coupled to said frame, said outrigger arms disposed along a plurality of radials of said vertical axis and circumpositioned symmetrically about the perimeter of said vehicle (10), said plurality of outrigger arms arranged and designed to be extended and retracted telescopically by motor-driven actuators along said plurality of radials; and a plurality of swivel casters (20) coupled to distal ends of said outrigger arms;

wherein said frame (14) has a circular circumference that surrounds said lift (62) and said operator's station (38); and whereby said plurality of outrigger arms and said plurality of swivel casters cooperate to support said vehicle (10).

8. The vehicle of claim 1 wherein said vehicle (10) further comprises:

first and second drive wheels (12R, 12L) rotatively coupled to said frame, each of said drive wheels capable of independent powered forward and rearward rotation about a horizontal axis (18) that intersects said vertical axis (16), said first and second drive wheels designed and arranged to revolve about said vertical axis;

a first control level (31R) positioned on a first side of said operators station being operatively coupled to a first motor (26R) for controlling the speed and rotation of said first drive wheel (12R); and a second control lever (31L) positioned on a second side of said operators station being operatively coupled to a second motor (26L) for controlling the speed and rotation of said second drive wheel (12L).

9. The vehicle of claim 1 wherein:

said lift is a scissor lift.

10. In an onmi-directional vehicle characterized by a generally circular shaped perimeter defining a vertical axis (16) and having a frame (14) and first and second drive wheels (12R, 12L) rotatively coupled to said frame, said frame (14) having a circular circumference that surrounds said drive wheels (12R, 12L), wherein each of said drive wheels is capable of independent powered forward and rearward rotation about a horizontal axis (18) that intersects said vertical axis, said first and second drive wheels being designed and arranged to revolve about said vertical axis, the improvement comprising:

a plurality of outrigger arms (23) having proximal ends coupled to said frame, said outrigger arms disposed along a plurality of radials of said vertical axis and circumpositioned symmetrically about the perimeter of said vehicle (10), said plurality of outrigger arms arranged and designed to be extended and retracted telescopically by motor-driven actuators along said plurality of radials; and a plurality of swivel casters (20) coupled to distal ends of said outrigger arms;

whereby said plurality of outrigger arms and said plurality of swivel casters cooperate to support said vehicle (10).

11. The vehicle of claim 1 further comprising a control station (38) arranged for controlling the motion of said vehicle and disposed on a lift (62) coupled to said frame, whereby the elevation of said control station with respect to said frame is selectively adjustable.

* * * * *